United States Patent [19]
Hatcher

[11] 3,859,907
[45] Jan. 14, 1975

[54] BOILED EGG DESHELLER

[75] Inventor: Glenn Hatcher, Denver, Colo.

[73] Assignee: Foodfac Inc., Westwood, N.J.

[22] Filed: Aug. 23, 1973

[21] Appl. No.: 390,724

[52] U.S. Cl............... 99/570, 99/571, 99/579, 209/97
[51] Int. Cl............................................. A23n 5/00
[58] Field of Search ............ 99/568, 569, 570, 571, 99/579; 259/2; 209/97, 98

[56] References Cited
UNITED STATES PATENTS
3,643,926   2/1972   Grieve ................................. 259/2
FOREIGN PATENTS OR APPLICATIONS
1,228,481   3/1960   France ................................. 99/569

Primary Examiner—Robert L. Bleutge
Assistant Examiner—Alan Cantor
Attorney, Agent, or Firm—Robert E. Burns; Emmanuel J. Lobato; Bruce L. Adams

[57] ABSTRACT

A desheller for hard boiled eggs comprises an elongated deshelling basket having pivots at its ends for mounting to oscillate laterally. The deshelling basket has closed sides and one closed end and is open top and bottom. The lower part of one end is also opened for discharging the shelled eggs. Upper and lower longitudinally extending runways are mounted in the basket in an inclined position so that eggs fed into the deshelling basket roll down the upper runway in one direction, drop onto the lower runway and roll down the lower runway in the opposite direction to the discharge opening in the end of the basket. The basket is rapidly oscillated so that as the eggs roll down the runways they are buffeted between the sides of the basket in such manner as to break and remove the shells. Water sprayed from beneath the upper runway keeps the basket clean and enters between the cracked shells and the eggs to assist in removing the shell. The runways are spaced inwardly from the sides of the basket so that the removed shells can fall through the spaces between the runways and the basket and drop out of the open bottom of the basket.

12 Claims, 4 Drawing Figures

BOILED EGG DESHELLER

The present invention relates to apparatus for deshelling hard boiled eggs.

Restaurants, hotels, hospitals and other institutions at time use large numbers of hard boiled eggs, the shells of which have to be removed. Moreover, it is proposed to package and sell shelled hard boiled eggs wholesale and retail. The shelling of large numbers of hard boiled eggs by hand is a tedious, time consuming and hence expensive operation. While mechanical deshellers have heretofore been proposed, they have been complicated and expensive and have left much to be desired in their operation.

It is accordingly an object of the present invention to provide simple and inexpensive yet highly effective apparatus for deshelling hard boiled eggs. In accordance with the invention the eggs are fed into an elongated deshelling basket which oscillates rapidly about a longitudinal axis. The basket has longitudinally extending upper and lower runways which are inclined in such manner that eggs fed onto the upper runway roll down it in one direction and drop onto the lower runway. They then roll down the lower runway in the opposite direction and are discharged through an opening in an end of the basket. As the eggs roll down the runways they are buffeted between the opposite sides of the oscillating basket so that the shells are broken and removed. The runways are spaced inwardly from the opposite sides of the basket so that the broken shells fall down through the spaces and are discharged through the open bottom of the basket. As the eggs roll down the lower runway, water is sprayed onto them from beneath the upper runway to wash away the broken shells and keep the basket clean. Moreover, the water enters between the eggs and the broken shells and assists in removing the shells from the eggs.

By means of the apparatus in accordance with the present invention, hard boiled eggs can be shelled rapidly and economically. With a machine in accordance with the invention 160 cases of eggs can be shelled in a day.

The nature, objects and advantages of the apparatus in accordance with the present invention will be understood more fully from the following description of a preferred embodiment shown by way of example in the drawings, in which.

Figure 1:
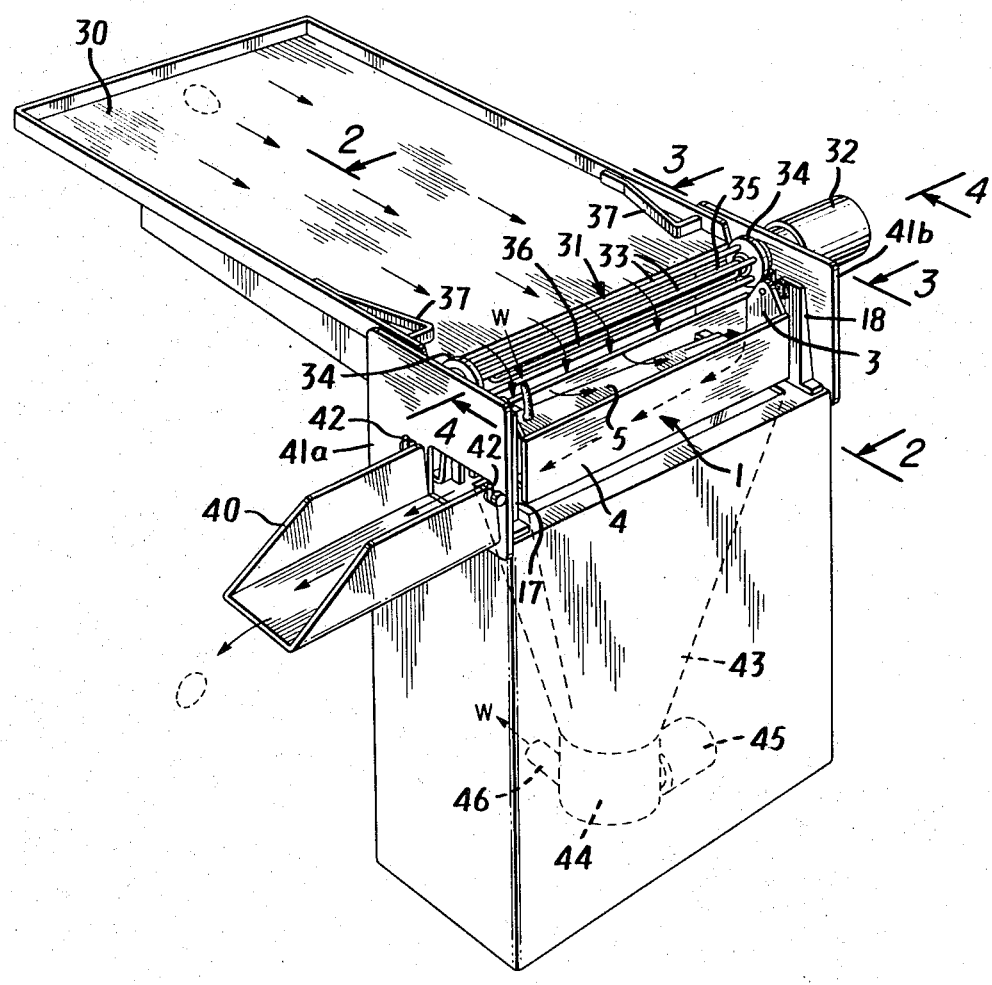
FIG. 1 is a perspective view of apparatus in accordance with the invention for deshelling hard boiled eggs.

The apparatus in accordance with the invention shown by way of example in the drawings comprises basically a deshelling basket in which the actual deshelling of the eggs is effected, means for feeding hard boiled eggs to the deshelling basket and means for separately discharging the shells and the deshelled eggs.

Figure 2:
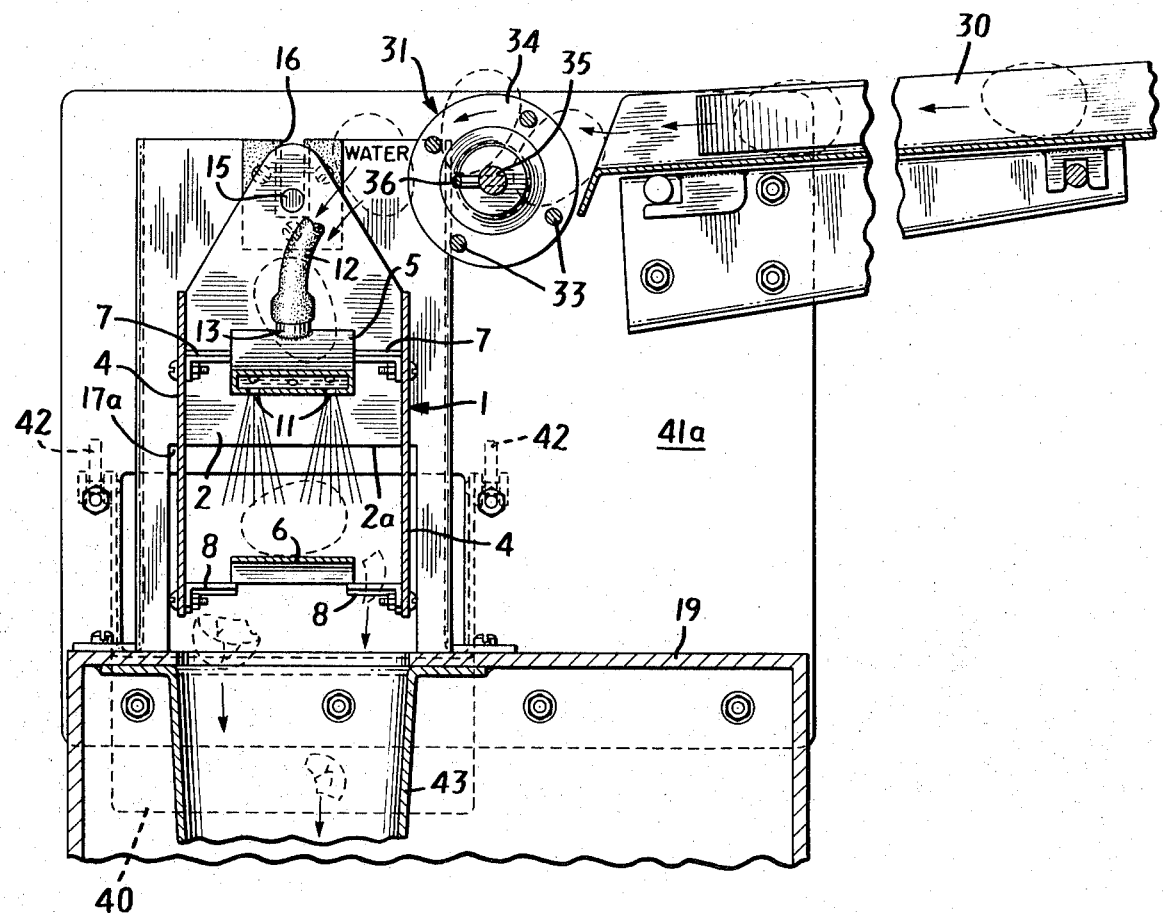
FIG. 2 is a cross sectional view taken on the line 2—2 in FIG. 2 and showing in cross section the egg deshelling basket and means for feeding eggs into the basket.
Figure 4:
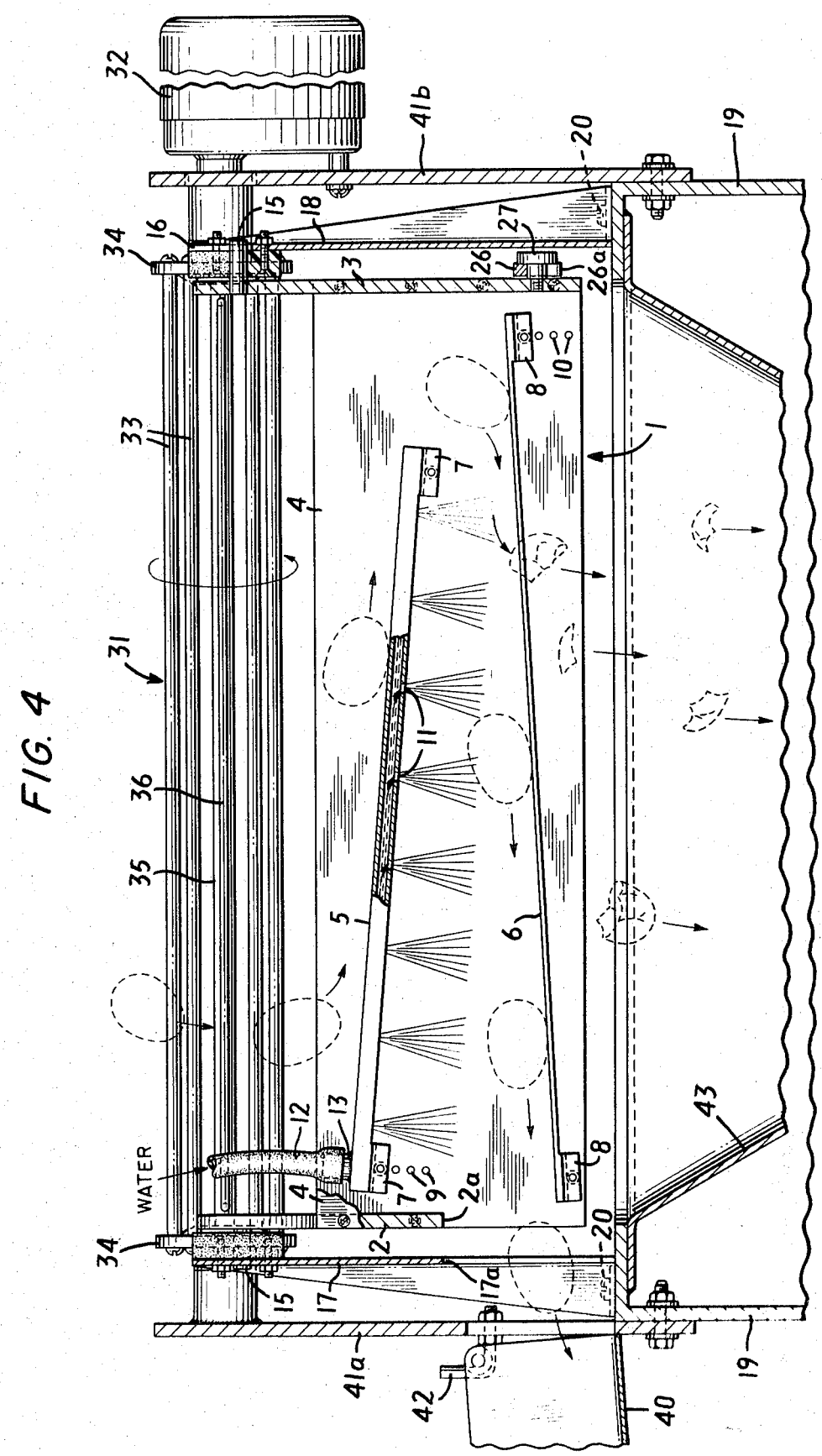
FIG. 4 is a longitudinal section taken approximately on the line 4—4 in FIG. 1.

The deshelling basket is an elongated box-like structure comprising end plates 2 and 3 to which opposite sides 4 are secured, for example by welding or by screws. The end plates may, for example, be 1/4 inch stainless steel plates while the sides are stainless steel sheet metal. The top and bottom of the deshelling basket are open. Moreover, an opening 2a is provided in the lower part of the end wall 2 for the discharge of shelled eggs as will be further described. An upper runway 5 and a lower runway 6 are mounted in the deshelling basket by means of brackets 7 and 8 respectively secured to the side walls 4. As will be seen from FIG. 4, the upper and lower runways are oppositely inclined so that eggs will roll down the runways by gravity. Whereas the lower runway 6 extends substantially the full length of the deshelling basket, the lower end of the upper runway 5 is spaced from the respective end of the basket so that eggs rolling down the upper runway 5 toward the right as seen in FIG. 4 will drop off of the lower end of the upper runway onto the upper end of the lower runway and then roll along the lower runway toward the left. In order to vary the speed at which the eggs roll on the runways and hence the time the eggs remain in the basket, provision is made for adjusting the angle of inclination of the runway. Thus, the upper runway 5 is shown pivotally mounted at its right hand end by means of bolts securing the brackets 7 to the sides walls of the basket while at the left hand end of the upper runway the sides of the basket are provided with a plurality of holes 9 by means of which the brackets 7 can be secured to the side walls at different heights. Similarly, the lower runway 6 is pivotally mounted at its left hand end and holes 10 are provided in the side walls of the basket at the right hand end of the lower runway to permit adjustment. As seen in FIG. 2 the longitudinal edges of the runways 5 and 6 are spaced inwardly from the respective side walls a distance sufficient to provide space through which the removed shells can fall while the eggs cannot. For example, the spacing of the edges of the runways from the side walls of the deshelling basket may be of the order of 9/16 inch to 3/4 inch.

Means is provided for directing a spray of water onto the eggs as they roll down the lower runway. For this purpose the upper runway 5 is made hollow and a multiplicity of small holes 11 having for example a diameter of 1/64 inch are drilled at random in the bottom wall of the upper runway. A flexible water supply tube 12 is connected to a nipple 13 opening into the hollow upper runway so that water is sprayed through the openings in the lower wall onto the lower runway and the eggs rolling thereon.

The deshelling basket 1 is pivotally mounted for oscillatory movement about a longitudinal axis. Pivotal support of the basket is provided by pivot pins 15 which project from upper portions of the end plates 2 and 3 and are received in notches 16 provided in end supports 17 and 18. The supports are preferably formed of stainless steel sheet and project upwardly from a base 19 to which they are secured by screws 20. The end support 17 is provided in its lower portion with an opening 17a to permit the passage of shelled eggs discharged through the end opening 2a of the deshelling basket. The pivot pins 15 are provided with suitable spacers to position the deshelling basket longitudinally between and spaced from the end supports. The height of the pivotal axis with respect to the shelling basket is selected to provide the desired operating characteristics. Thus, if desired, the axis can be somewhat lower than is illustrated in the drawings so as to be at approximately the level of the upper end of the upper runway.

This will result in the upper runway having only a relatively small oscillatory movement.

Figure 3:
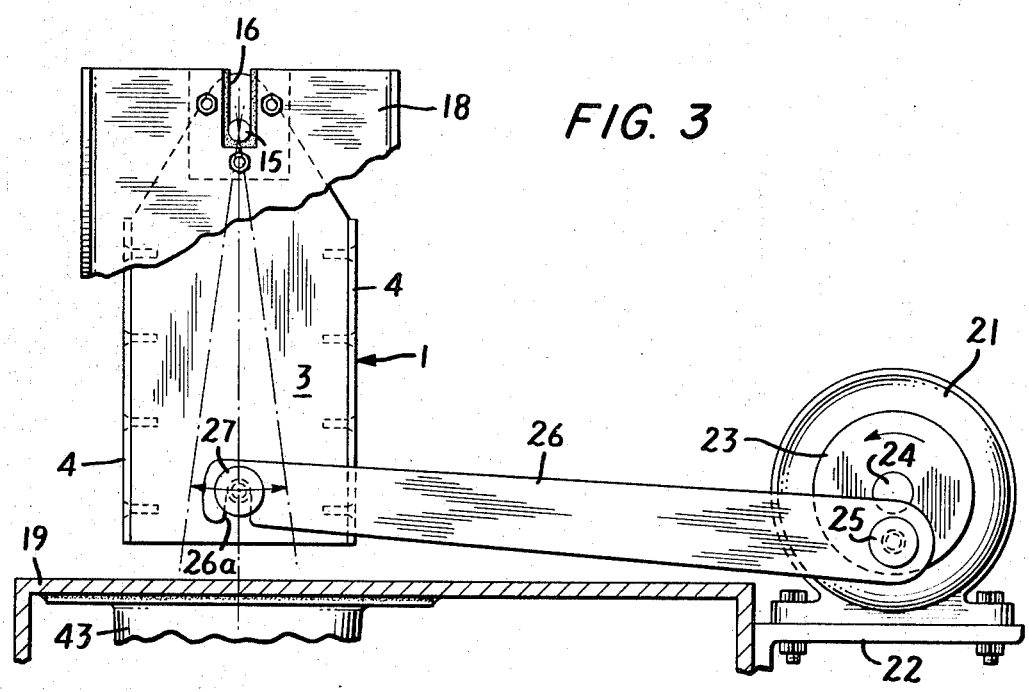
FIG. 3 is a partial end view showing means for oscillating the basket.

Drive means is provided for oscillating the deshelling basket 1 about the longitudinal axis provided by the pivot shafts 15. The driving means is shown as comprising an electric motor 21 on a subbase 22 mounted on the base 19. A disc 23 fixed on the shaft 24 of the motor carries an eccentrically located pin 25. A link 26 having one end rotatably mounted on the eccentric pin 25 has at the opposite end a hook-like notch 26a engaging the shank of a shouldered screw 27 screwed into a centrally located tapped hole in the lower portion of the end plate 3 of the deshelling basket. As will be seen from FIG. 3, rotation of the disc 23 by the motor 21 produces oscillatory movement of the deshelling basket from side to side about the pivots 15. The amplitude of the oscillatory movement is determined by the eccentricity of the pin 25 and is preferably about 2 inches measured at the level of the screw 27. The frequency of oscillation is determined by the speed of rotation of the disc 23 by the motor. The motor 21 is preferably of variable speed and is suitable geared down to provide 200 to 400 oscillations of the deshelling basket per minute.

The dimensions of the deshelling basket are selected so that when the basket is oscillated as described the eggs rolling down the runways and particularly the lower runway 6 are buffeted between the sides of the deshelling basket so as to break and remove the shells which fall down through the spaces between the edges of the runway and the sides of the basket. The water spray through the holes 11 in the bottom of the upper runway 5 serve not only to wash away the shell fragments and keep the lower runway and basket clean, but also assist in removing the shells from the eggs. It has been found that the water tends to get in between the eggs and the cracked or broken shells by capillary action and force the shell from the egg. The length of the deshelling basket is selected according to the operating characteristics desired. By having a longer basket the eggs can be passed through at a higher rate and still be subjected to sufficient deshelling action during their passage through the basket. For example, the deshelling basket may have a length of from 24 inches to 48 inches. The parameters affecting the deshelling action, namely the dimensions of the basket, the inclination of the runways and the amplitude and frequency of the oscillations of the basket are selected to provide the desired operating characteristics. The variable parameters make it possible to accommodate different sizes and types of eggs. For example, some types of eggs have harder shells than others so as to require a more vigorous deshelling action.

Suitable means is provided for feeding eggs continuously or intermittently to the deshelling basket. The feed means shown by way of example in the drawings comprises a tray 30 which has a width approximately equal to the length of the deshelling basket and which is inclined downwardly toward the basket. Located at the lower edge of the tray and above the deshelling basket there is a rotary feeder 31 rotatably supported by end plates 41a and 41b of the machine and driven by a variable speed gear reduction motor 32 mounted on end plate 41b. As illustrated particularly in FIGS. 2 and 4, the rotary feeder comprises a plurality of circumferentially spaced rods 33 extending between end discs 34 rotatable about a shaft 35 by the motor 32. By reasons of the inclination of the tray 30, eggs placed on the tray roll down to the rotary feeder and as illustrated in FIG. 2 are carried over by the feeder one row at a time and dropped onto the upper runway 5 of the deshelling basket. A stationary rod 36 located radially inwardly of the orbiting rods 33 assists in discharge of the eggs from the rotary feeder in an orderly and uniform manner. The speed at which the rotary feeder is driven is coordinated with the rate at which the eggs are deshelled in the deshelling basket so that when row of eggs has progressed from the upper runway a succeeding row of eggs is deposited thereon. Inclined side guides 37 are provided at opposite sides of the tray 30 near its lower end to direct the eggs inwardly in proper position to be received by the rotary feeder.

As described above, the eggs are deshelled as they pass down the runways 5 and 6 in the deshelling basket and are discharged through the opening 2a at one end of the basket. The shelled eggs can thereafter be handled in any desired manner. As illustrated by way of example in the drawings, the eggs are discharged into an inclined chute 40 which is removably and adjustably mounted on the end plate 41a of the machine by means of hook bolts 42. The shelled eggs discharged from the chute 40 can be collected in a receptacle, delivered to a conveyor or otherwise handled as desired.

Likewise, the broken egg shells discharged through the open bottom of the deshelling basket can be collected, transported or otherwise handled as desired. As illustrated by way of example in the drawings, the eggs shells together with the water from the spray in the deshelling basket fall into a hopper 43 by which they are directed to a disposal unit 44 driven by an electric motor 45. The ground up shells mixed with water are discharged through a line 46.

The entire structure or at least all portions coming into contact with the eggs are preferably formed of stainless steel so as to be noncorroding and completely sanitary. Moreover, the parts are made in such a manner as to permit them to be conveniently disassembled for cleaning. Thus, thie link 26 (FIG. 3) for oscillating the deshelling basket can be readily unhooked from the shoulder screw 27 whereupon the entire basket can be lifted out since the basket is supported only by the pivot pins 15 resting in bearing notches or recesses in the end supports 17 and 18.

The apparatus in accordance with the invention has been found to be highly effective in removing the shells from hard boiled eggs without breaking or in any way damaging the eggs. Moreover, by reason of its simplicity, the apparatus is of rugged and durable construction, is easily cleaned and is inexpensive to manufacture. By providing for variation in the parameters affecting its operating characteristics, the machine can be adjusted as required for the type of eggs being handled and for the desired rate of operation.

While a preferred embodiment of the machine has been illustrated in the drawings and is herein particularly described, it will be understood that the invention is in no way limited to this embodiment and that many modifications may be made in details of design and construction.

What I claim and desire to secure by Letters Patent is:

1. Apparatus for deshelling hard boiled eggs, comprising an elongated box-like deshelling basket having ends and opposite side walls with openings in the top, bottom and one end of the basket, an inclined runway extending lengthwise in said basket and having a lower end directed toward said end opening so that eggs deposited on said inclined runway will roll down the runway and be discharged through said end opening, opposite lateral edges of said runway being spaced inwardly from the respective side walls of said basket, means pivotally supporting said basket for oscillation about a longitudinal axis above said runway and means for oscillating said basket about said axis through a selected arc and at a selected frequency, whereby eggs rolling down said runway are buffeted between the opposite side walls of said oscillating basket to break and remove the shells from the eggs, the shelled eggs being discharged through said end opening and the broken shells falling through the spaces between said runway and the side walls of the basket and through the open bottom of the basket.

2. Apparatus according to claim 1, comprising means for directing a pressure spray of water onto said eggs as they progress down said inclined runway to assist in removing shells from the eggs and to wash said runway and the interior of said basket.

3. Apparatus according to claim 1, comprising a second runway extending longitudinally in said basket above said first mentioned runway and inclined in the opposite direction, the lower end of said second runway being set in from the upper end of said first mentioned runway, whereby eggs deposited on the second runway roll down it and drop onto an upper end portion of said first mentioned runway and then roll down said first mentioned runway.

4. Apparatus according to claim 3, in which said second runway is hollow with upper and lower walls and with a multiplicity of small holes in the lower wall, comprising means for supplying water under pressure to said hollow runway whereby said water is sprayed through said holes onto said first mentioned runway and eggs thereon.

5. Apparatus according to claim 3, in which the pivotal axis of said basket is farther from said first mentioned runway than said second runway whereby said first mentioned runway is moved through a larger arc than said second runway by said oscillation of the basket.

6. Apparatus according to claim 1, in which said means for oscillating said basket comprises a drive member rotatable about an axis parallel to the pivotal axis of said basket, means for rotating said drive member, pivot means on said drive member eccentric of the axis of rotatiton of said drive member and link means connected with said pivot means and with said basket at a location spaced from said axis of oscillation, whereby rotary movement of said drive member produces oscillatory movement of said basket.

7. Apparatus according to claim 6, comprising means for varying the speed of rotation of said drive member and thereby varying the frequency of oscillation of said basket.

8. Apparatus according to claim 7, in which the range of variation of the frequency of oscillation of said basket is between 200 and 400 cycles per minute.

9. Apparatus according to claim 1, comprising means for varying the angle of inclination of said runway and thereby varying the rate at which said eggs roll down the runway.

10. Apparatus according to claim 1, comprising means for feeding eggs to said basket at a selected rate coordinated with the rate at which the eggs are deshelled in said basket.

11. Apparatus according to claim 10, in which said feed means comprises a tray for receiving eggs to be deshelled, said tray sloping down toward said basket, and means at a lower edge of said tray for feeding eggs from the tray into said basket at a selected rate.

12. Apparatus according to claim 1, in which said means for pivotally supporting said basket comprises pivot shafts projecting from opposite ends of said basket and support members with open bearing recesses receiving said pivot shafts, whereby said basket can be lifted out for cleaning, reconditioning or replacement.

* * * * *